Feb. 6, 1923.

J. JENSÉN.
MACHINE FOR BORING TUFT HOLES IN BRUSH BLOCKS.
FILED APR. 20, 1920.

Inventor:
Jens Jensén
By Lawrence Langner
Attorney.

Feb. 6, 1923.
J. JENSÉN.
MACHINE FOR BORING TUFT HOLES IN BRUSH BLOCKS.
FILED APR. 20, 1920.
1,444,075
3 SHEETS-SHEET 2
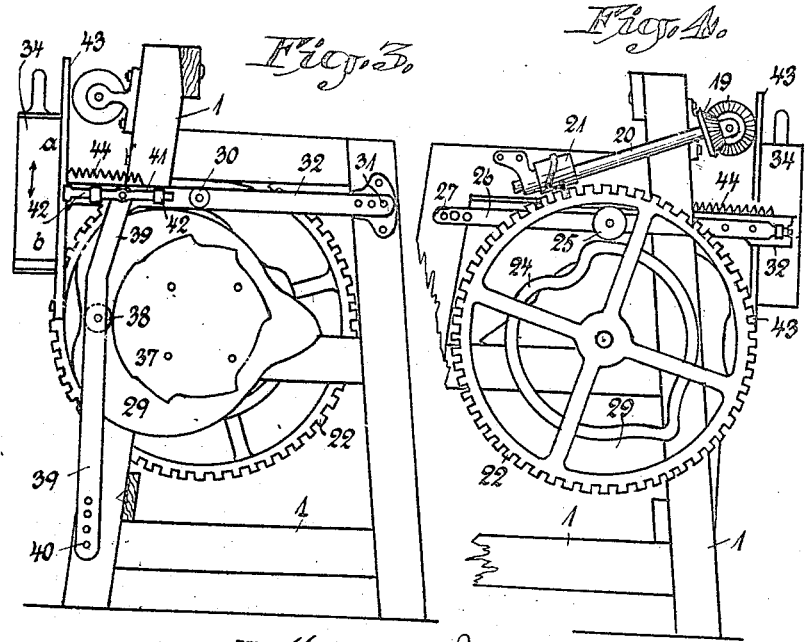
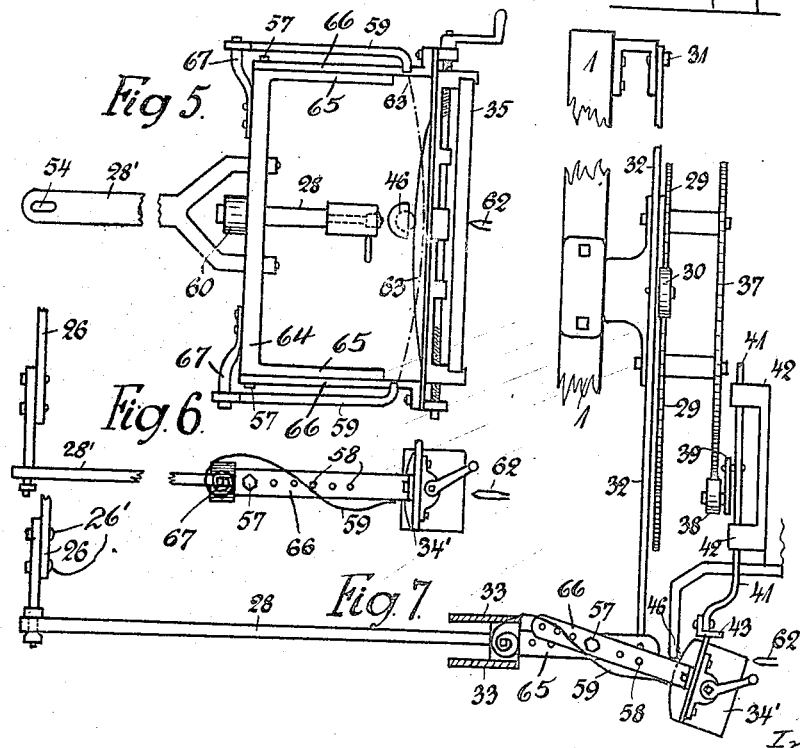
Inventor.
Jens Jensén
By Lawrence Langner
Attorney.

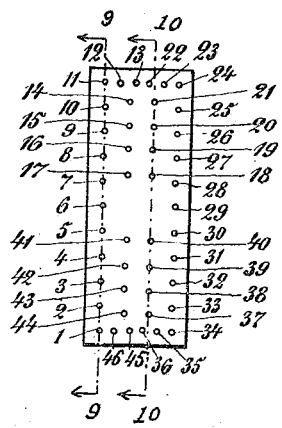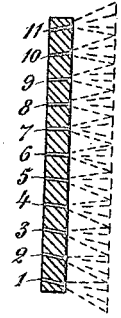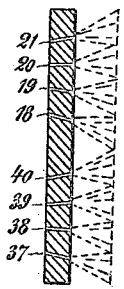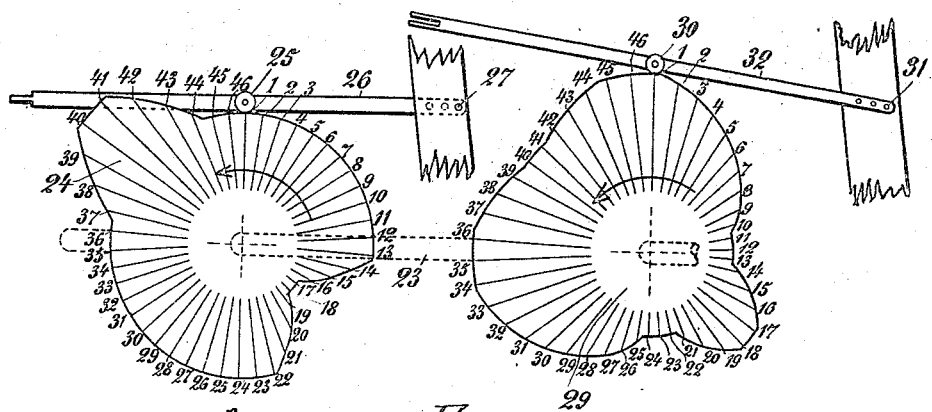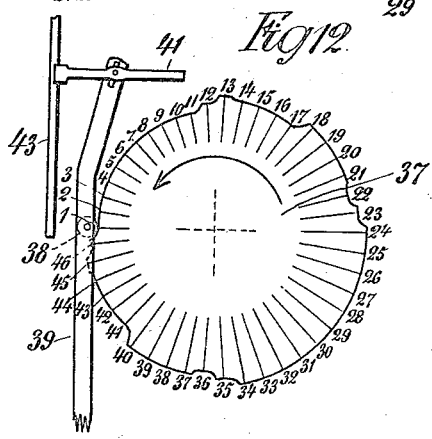

Patented Feb. 6, 1923.

1,444,075

UNITED STATES PATENT OFFICE.

JENS JENSÉN, OF THISTED, DENMARK.

MACHINE FOR BORING TUFT HOLES IN BRUSH BLOCKS.

Application filed April 29, 1920. Serial No. 375,299.

*To all whom it may concern:*

Be it known that I, JENS JENSÉN, a subject of the King of Denmark, residing at Tilsted pr. Thisted, Denmark, have invented a new and useful Improvement in Machines for Boring Tuft Holes in Brush Blocks; and I do hereby declare the following to be a full, clear, and exact description of the same.

The invention relates to a machine for the automatic boring of tuft holes in bush-blocks by a system of cams and levers, whereby it is possible to bore the holes with the desired inclination and spacing irrespective of whether the wood has a plane surface or a surface curved transversely or longitudinally, or both.

By virtue of my invention it is possible to bore, by means of a single automatically operating machine, brush-blocks with the holes in any single row either parallel, divergent, convergent or having any combination of these three arrangements.

In order to bore the holes in a brush-block, when the boring shaft is journaled in fixed bearings, in such manner that the holes may have the right direction, it is necessary to impart to the work-table three different motions. By the present invention, this is attained by means of three cam wheels of suitable shape and levers with rolls running on the cam wheels, said levers being operatively connected to the work-table and moving it in three different directions. One motion is a rocking motion of the work-table and the work carried thereby with a fixed guide or support opposite to the bit of the drill as the fulcrum point for the rocking motion. The second motion is effected in the longitudinal direction of the work-table and the third motion in the lateral direction thereof. During all of these motions the work-table and the work are guided by the fixed guide or support.

The invention is illustrated in the accompanying drawings, in which—

Figure 3 is a vertical sectional view of the machine taken on the line A—A of Figure 1 looking in the direction of the arrows;

Figure 4 is an end view of the machine looking from the left, Figure 1;

Figures 5 and 6 are detail views on an enlarged scale of a modified form of work-table;

Figure 7 is a view on an enlarged scale of the work-table shown in Figures 5 and 6 and co-operating parts of the machine;

Fig. 8 shows a bored brush-block in elevation;

Figure 1:
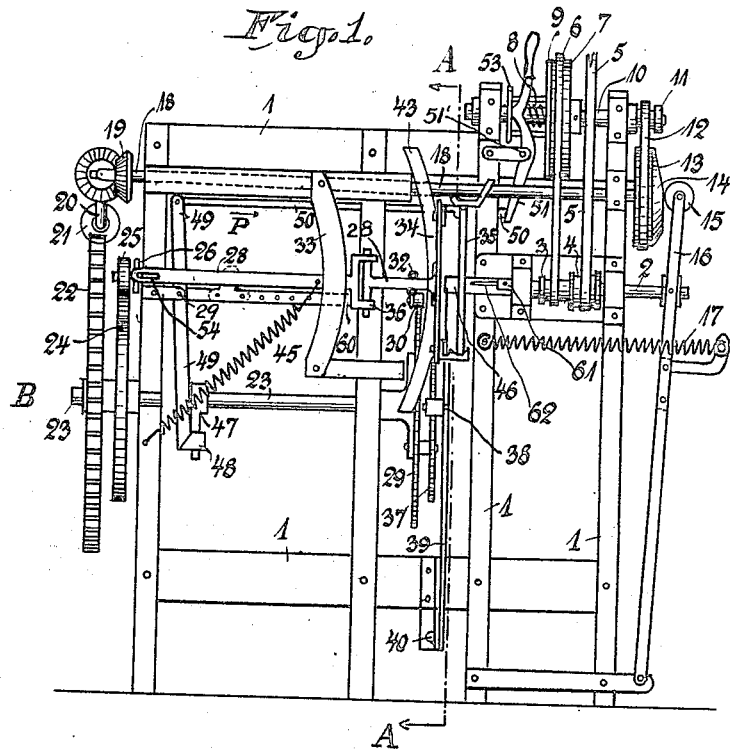
Figure 1 is a view in side elevation of the machine.
Figure 2:
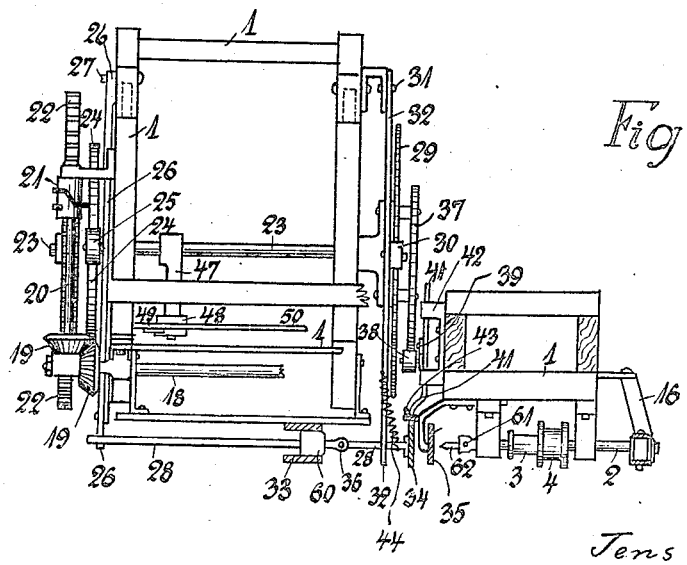
Figure 2 is a top plan view of the machine, the right-hand portion thereof being shown in horizontal section.

Figs. 9 and 10 are sectional views taken on the lines 9—9 and 10—10, respectively, of Fig. 8.

Figs. 11 and 12 are views illustrating the configuration of each of the cam disks 24, 29 and 37 used for boring the brush-blocks shown in Figs. 8, 9 and 10, these views illustrating also the manner in which these disks cooperate in timed relation with their respective levers 26, 32 and 39.

The machine comprises a frame 1 in which is mounted, in suitable bearings, the boring shaft 2, provided with the chuck 61 for the drill 62 and carrying pulleys 3 and 4. The pulley 4 is driven through a belt 5 from the source of power of the machine. From the pulley 3 a belt 6 runs to a pulley 7 loose on a shaft 10, said loose pulley also constituting a friction member. A friction disk 9 splined to the shaft 10 is adapted to be pressed against the friction face of pulley 7 by a spring 8 so as to cause the shaft 10 to be rotated with the pulley.

The shaft 10 carries a pulley 11 from which the pulley 13 is driven through a belt 12, said pulley 13 being formed with a face-cam 14. A lever 16 is pivoted at its lower end to the frame 1 and carries at its upper end a roll 15 held in engagement with the face-cam 14 by a coil spring 17 connected at one end to the lever and at its other end to the frame 1. The lever 16 is connected to the shaft 2 to impart reciprocatory motion thereto while permitting said shaft to rotate.

The pulley 13 is fixed on the end of a shaft 18 on the other end of which is carried a bevel pinion 19 in mesh with a similar bevel pinion 19 mounted on the end of a shaft 20 arranged at right angles to the shaft 18. The shaft 20 carries a worm 21, the thread of which is perpendicular to the axis of the shaft 20 for about two-thirds of the circumference of the worm, the remaining part of the thread having a pitch corresponding to the tooth spacing of the worm-wheel 22, the latter being driven by said worm 21.

It will be seen that for each complete revolution of the shaft 20, the worm 21 will drive the worm-wheel 22 a distance measured on its circumference equal to the distance between centers of a pair of adjacent teeth, the gear wheel being given a step-by-step motion for imparting, as hereinafter explained, the necessary movements to the work 35 on the work-table 34. The holes in the work are bored during the intervals of rest of the gear wheel 22 between successive step-by-step movements.

A cam-wheel 24 is carried on the shaft 23 adjacent the worm-wheel 22 and a lever 26 pivoted at one end on a bolt 27 has a roll 25 in engagement with the edge of said cam-wheel. The lever 26 is made in two sections secured together by the bolts 26' as shown in Figures 6 and 7.

The free end of the lever 26 extends through an elongated slot 54 in one end of a lever 28, also made in two parts which are pivotally connected at 36. To the other end of the two-part lever 28 is fixed the work-table 34 which carries the work 35 in the form of a brush-block. The rear face of the work is engaged by the ball-shaped or semi-ball-shaped end of a fixed guide or support 46 and the roll 25 running on the edge of the cam-wheel 24 causes the work-table and the work to slide on said fixed guide or support, the lever 28 being guided in its vertical movement between fixed arcuate plates 33.

On the end of the shaft 23 opposite that carrying the cam-wheel 22 is fixed a cam-wheel 29. A lever 32 pivoted at one end on a bolt 31 carries a roll 30 arranged to engage the edge of said cam-wheel. A coil spring 45, fixed at one end to the frame 1 and at its other end to the lever 28, exerts a rearward and downward pull on said lever tending to maintain the work 35 in engagement with the guide 46 and the roll 30 in engagement with the cam-wheel 29. The free end of the lever 32 is bifurcated and receives between its branches the lever 28, whereby the lever 32 is adapted to move the lever 28 upwards and downwards between the guide plates 33 in order to impart to the work-table 34 and work 35 movement in the longitudinal direction of the work-table (the direction of the arrow a, Figure 3). Such movements of the lever 28 takes place about the free end of the lever 26 as a pivot.

Fixed to the cam-wheel 29 is a smaller cam-wheel 37, contacting with the peripheral edge of which is a roll 38 carried by a lever 39, the latter being pivoted at one end on a bolt 40. The lever 39 is connected at its opposite end to a rod 41 sliding in bearings 42. The slide-rod carries at one end a guide-bar 43 engaging the edge of the work-table 34. When the rod 41 and guide-bar 43 are moved forwards and backwards, the work-table 34 is moved forwards and backwards on the fixed guide or support 46 (the direction of the arrow b, Figure 3). such movements of the work-table being permitted by reason of the joint or pivot 36 in the lever 28. A coil spring 44 is connected at one end to the lever 28 and at its other end to the lever 32. The spring 44 exerts its tension to press the work-table 34 against the guide-bar 43, thereby displacing the rod 41 in its bearings 42 so that the roll 38 of lever 39 is pressed against the cam-wheel 37.

The fixed guide or support 46 has its ball-shaped or semi-ball-shaped head arranged coaxially with the drill 62, so that all the holes bored in the work 35 end at the same distance from the guide, notwithstanding the motion in the different directions of the work. The fixed guide or support 46 is capable of adjustment on the frame 1 to vary the distance of its head from the bit of the drill.

When the worm-wheel 22, which has teeth corresponding in number to the number of holes to be bored in the work 35, has made one revolution, a roll 48 carried on an arm 47, fixed to and rotating with the shaft 23, contacts with the end of a lever arm 49 rocking the latter on its pivot 49' and thereby causing the displacement of a rod 50 in the direction of the arrow P, Figure 1, said rod being pivotally connected at one end to the opposite end of the lever 49. The free end of the rod 50 is in engagement with the end of a lever 51 pivoted at 51' on the frame 1 and, when said rod 50 is displaced in the direction of the arrow P, the lever 51 is rocked on its pivot. The lever 51 engages a disk 53 connected with the friction disk 9 and the rocking movement of the lever 51 caused by the displacement of the rod 50 causes the friction disk 9 to be moved out of engagement with the pulley 7 thereby stopping the shaft 10 and the mechanism driven thereby while the drill, however, continues to rotate. The finished brush-block may now be removed from the work-table and another substituted therefor, whereupon the lever 51 may be moved manually by the handle 52 to release the friction disk 9 so that the operation of the machine may be renewed.

Work-tables of different constructions may be used in the machine. In Figure 1 a simple work-table 34 is shown and in Figures 5 and 6 a universal table 34'. In the latter the work does not engage the fixed guide or support 46, but on the contrary the work-table 34' or a plate 63 or 63' arranged on the same, engages the guide. For the plates 63 or 63' may be substituted other plates of shapes contingent on the work to be operated on, so that it is possible to operate with any kind of work, whether the same has a plane surface or a surface curved longitudinally or transversely, or both.

The oblong hole 54 in the end of the lever 28 for the reception of the end of the lever 26 permits the lever 28 to move longitudinally independently of the lever 26 as the different plates 63, 63', or the work-table 34 or 34' or the work 35 is moved over the fixed guide 46 by the cams 29 and 37 and their co-operating rolls and levers.

In the construction shown in Figures 5, 6 and 7, the lever 28', like the lever 28 of Figure 1, is in two parts, the parts being connected by a U-shaped member 64, to the horizontal arms 65 of which are pivotally connected by means of bolts 57, the links 66 which carry the universal table 34'. The arms 65 and links 66 are each provided with a number of holes 58 so that by shifting the pivot bolts 57 to different holes, the radius of the movement of the table 34' caused by the cam wheel 37 and co-operating parts can be varied. In this form of the construction, the coil spring 44 is not used, but instead two torsion coil springs 59 fixed upon arms 67 carried by the U-shaped member 64 and having their free ends in engagement with the links 66.

A roll 60 is arranged on the lever 28 or 28' between the guide plates 33 to reduce friction and the levers 26, 32 and 39 are provided at their pivot ends with a number of holes so that by shifting the pivot bolts 27, 31 and 40 to different holes, the space between the holes to be bored in the work can be altered by degrees without any alteration of the cam-wheels.

The construction which has been described is for boring the holes in brush-blocks for street brooms, in which the holes in certain rows are to be bored at special angles, as illustrated in Fig. 10 in which the holes are partly convergent and partly divergent, and in which the holes in certain other rows are to be either parallel, or slightly divergent as illustrated in Fig. 9. Prior to his invention it was impossible to bore with a single machine brush-blocks with holes having these three different arrangements. In other words, in brush-blocks bored by means of the known machines, the axes of the different holes in any longitudinal row of holes radiate from a single point or are, at least, divergent. To bore parallel holes or holes which are partly convergent and partly divergent it has before been necessary to use special types of machines or two or more machines for each brush-block.

The main advantage of my machine is that by the use of various forms of interchangeable cams, it can bore holes of the three different arrangements mentioned or any combination thereof. In other words, the machine of my invention can do work which it has heretofore been impossible to perform by means of a single automatically operating machine. For example, if the lever 28 was tilted about a fixed pivot by the lever 32 instead of about the movable end of the lever 26, the machine would bore the holes having the arrangement illustrated in Fig. 9. By the addition of the lever 26, holes arranged as illustrated in Fig. 10 or holes with their axes parallel may be bored.

Referring to Figs. 11 and 12, the timed relation between the cams 24, 29 and 37 is illustrated for boring of a brush-block with the holes arranged as illustrated in Figs. 8, 9 and 10.

Take, for instance, the boring of the holes 1 to 11, inclusive, of an outer row. It will be seen that the rollers 25 and 38 on the levers 26 and 39 move over concentric portions of cams 24 and 37, respectively, while the roller 30 on the lever 32 is moving over an eccentric portion of the cam 29. Therefore, the lever 28 is tilted about the end of lever 26 as a fixed pivot and the holes 1 to 11, inclusive, are bored with their axes diverging. Consider next the boring of the holes 12 and 13. It is seen that the rollers 25 and 30 move over concentric portions of the cams 24 and 29, so that the axes of the holes 12 and 13 have the same inclination as the axis of the hole 11, while the roller 38 moves over eccentric portions of the cam 37 in order to shift the work holder 34 laterally for the proper spacing of the holes 12 and 13. Again, consider the boring of the holes 18, 19, 20 and 21. While the roller 38 is moving over a concentric portion of cam 37, the rollers 25 and 30 are moving over eccentric portions of the cams 24 and 29. It will thus be seen that the cam 29 will cause the lever 28 to be moved about the end of lever 26 as a pivot for spacing the holes 18, 19, 20 and 21, while the cam 24 will cause the lever 28 to be moved about the end of lever 32 as a pivot in order to properly incline the axes of the bored holes. It is quite evident that if cams 24 and 29 are selected having corresponding portions adapted to move the free ends of the levers 26 and 32 equal amounts, then the lever 28 will simply assume different positions parallel to itself and, therefore, holes will be bored having their axes parallel.

Having now described my invention what I claim is:—

1. A machine for drilling brush blocks, comprising a block holder, means for swinging said block holder about an axis, to shift the block in said holder longitudinally to thereby space the holes of a row, and means for swinging said block about a substantially parallel axis, to give the holes in said row the desired inclination, both axes being located at a finite distance.

2. A machine for drilling brush-blocks, comprising a block holder, a lever pivoted at one end to the frame of the machine, a second lever pivoted at one end to the free end of said first-mentioned lever and carrying said block holder at its opposite end, a third lever pivoted at one end to the frame of the machine and having its free end in engagement with said second lever intermediate the ends of the latter, a cam for actuating said third lever to swing said second lever about the free end of said first-mentioned lever to shift the block in said holder longitudinally to thereby space the holes of a row, and a cam for actuating said first-mentioned lever to swing said second lever about the free end of said third lever to give the holes in said row the desired inclination.

3. A machine as in claim 2, the said second lever comprising two parts, hinged together, one part swinging in a plane for spacing the holes of a row and the other swinging in a plane perpendicular to the first named plane, for spacing the rows of holes.

4. A machine as in claim 1, in combination with a drilling element having means for moving the same relative to the block holder.

In testimony whereof I have affixed my signature in presence of two witnesses.

JENS JENSÉN.

Witnesses:
 VIGGO BLOM,
 C. V. HÓGSTED.